US012115798B2

(12) United States Patent
Nagata et al.

(10) Patent No.: US 12,115,798 B2
(45) Date of Patent: Oct. 15, 2024

(54) PRINTING METHOD

(71) Applicant: HONDA MOTOR CO., LTD., Tokyo (JP)

(72) Inventors: Takaaki Nagata, Tokyo (JP); Tohru Takamura, Tokyo (JP); Tomohiko Shigihara, Tokyo (JP); Toshio Kazami, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 18/101,595

(22) Filed: Jan. 26, 2023

(65) Prior Publication Data

US 2023/0241900 A1 Aug. 3, 2023

(30) Foreign Application Priority Data

Jan. 30, 2022 (CN) ........................ 202210113385.7

(51) Int. Cl.
*B41J 2/21* (2006.01)
*B41J 2/045* (2006.01)

(52) U.S. Cl.
CPC ......... *B41J 2/2132* (2013.01); *B41J 2/04505* (2013.01)

(58) Field of Classification Search
CPC .. B41J 2/2132; B41J 2/04505; B41J 3/40731; B41J 2203/01; B41J 3/4073; B41J 25/308; B41F 17/00; B41F 33/0009; B41F 33/0036
See application file for complete search history.

(56) References Cited

U.S. PATENT DOCUMENTS

2017/0098143 A1* 4/2017 Mader .................. G06K 15/408

FOREIGN PATENT DOCUMENTS

JP 07-137248 5/1995

* cited by examiner

*Primary Examiner* — Bradley W Thies
(74) *Attorney, Agent, or Firm* — Amin, Turocy & Watson, LLP

(57) ABSTRACT

A printing method for printing a first image and a second image while changing a relative position and a relative attitude of a print head relative to a printing object, includes a first printing step of printing a first print image obtained by forming an unprinted region in the first image, a detecting step of detecting the unprinted region, an adjusting step of adjusting the print head such that the second image adjoins the first image, and a second printing step of printing a second print image including the second image and a partial image.

12 Claims, 8 Drawing Sheets

PRINTING METHOD

CROSS-REFERENCE TO RELATED APPLICATIONS

This application is based upon and claims the benefit of priority from Chinese Patent Application No. 202210113385.7 filed on Jan. 30, 2022, the contents of which are incorporated herein by reference.

BACKGROUND OF THE INVENTION

Field of the Invention

The present invention relates to a printing method.

Description of the Related Art

JP H07-137248 A discloses a printing method for printing a specific mark on a printing object (a printed material). The feed amount of the printing object and the deflection amount of ink droplets discharged from an electrostatic deflection type ink jet nozzle are adjusted according to the print position interval for the mark. Occurrence of white streaks or black streaks on a printed image is prevented.

SUMMARY OF THE INVENTION

According to the printing method disclosed in JP H07-137248 A, there is a problem that the printed mark may remain on a printing object and consequently the image quality may be impaired.

An object of the present invention is to solve the above-described problem.

According to an aspect of the present invention, there is provided a printing method of printing a first image and a second image on a printing object, by using a print head, while changing a relative position and a relative attitude of the print head relative to the printing object, the printing method including: a first printing step of printing a first print image on the printing object by using the print head, the first print image being obtained by forming an unprinted region in the first image; a detecting step of detecting the unprinted region, by using a sensor provided on the print head, at the relative position and the relative attitude of the print head used when the second image is printed; an adjusting step of adjusting the relative position and the relative attitude of the print head in a manner so that the second image adjoins the first image, based on the unprinted region that has been detected; and a second printing step of printing a second print image on the printing object by using the print head, the second print image including the second image and a partial image to be printed in the unprinted region.

According to the present invention, it is possible to prevent white streaks or black streaks from occurring in printed images without impairing image quality.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
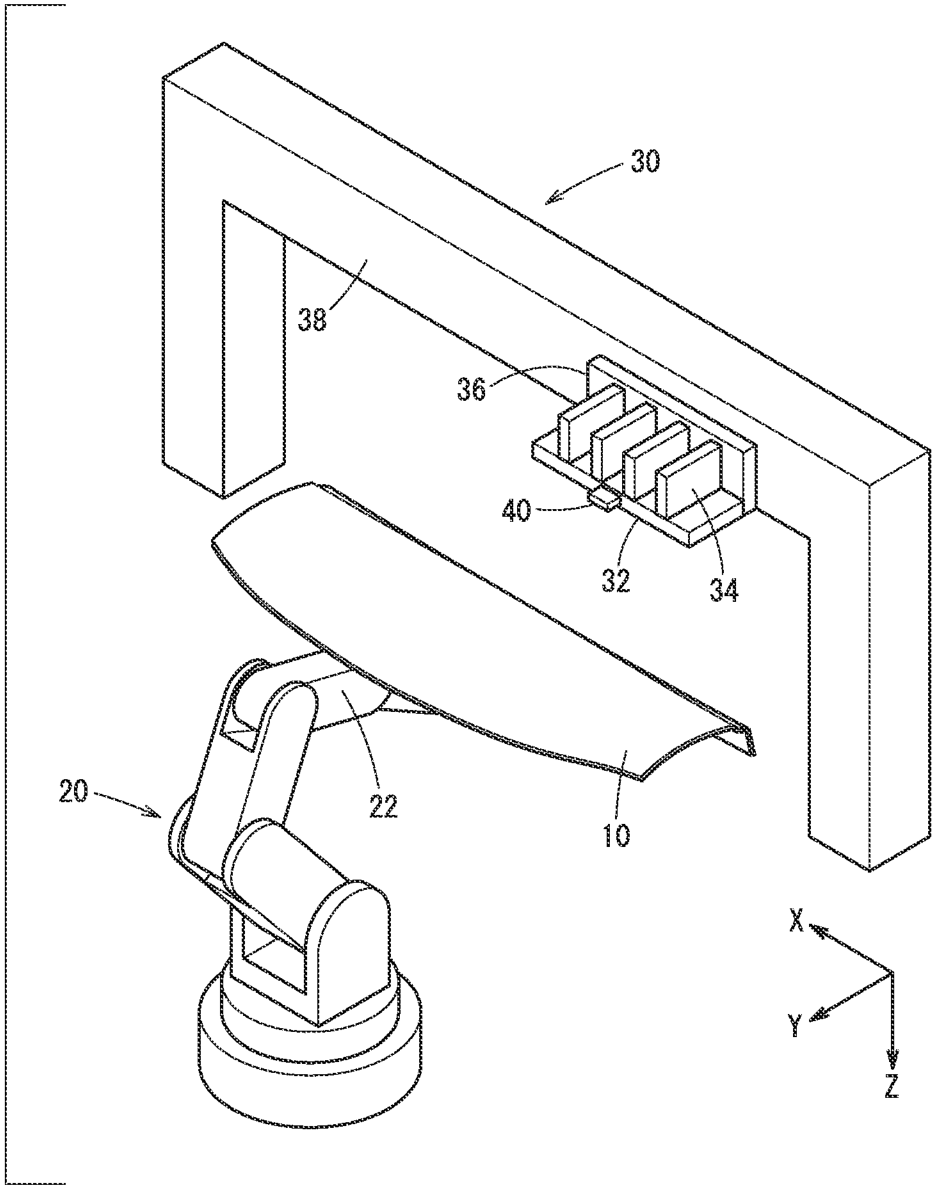
FIG. 1 is a diagram illustrating how an image is printed on a printing object by a printing method according to an embodiment.

FIG. 1 is a diagram illustrating how an image is printed on a printing object (i.e., a material on which an image or the like is printed) 10 by a printing method according to an embodiment of the present invention. The printing object 10 is, for example, an interior panel used for the interior of an automobile. In the present embodiment, the printing object 10 has a printing surface of a non-flat three dimensional shape, but the printing object 10 may have a printing surface of a two dimensional shape. The printing object 10 is gripped by a gripping device 20. The gripping device 20 is, for example, a robot having a multi-axis articulated arm 22. A gripping portion (not shown) is attached to an end portion of the arm 22. The printing object 10 is gripped by the gripping portion.

A printing device 30 prints an image on the printing object 10. The printing device 30 includes a print head 32, a plurality of ink tanks 34, a carriage 36, a rail 38, and a sensor 40. The print head 32 includes a plurality of ink tanks 34 for different colors. Each ink tank 34 discharges ink droplets in the Z-axis direction (gravity direction) toward the printing surface of the printing object 10 during printing. The carriage 36 moves the print head 32 along the rail 38 during printing. The rail 38 extends linearly along the X-axis direction (horizontal direction). The Y-axis direction (horizontal direction) is orthogonal to the Z-axis direction and the X-axis direction.

The sensor 40 is provided in the print head 32. The sensor 40 is, for example, a camera. In the present embodiment, the detection process by the sensor 40 is an imaging process by a camera. The camera generates a captured image when capturing an image of the printing surface of the printing object 10.

When an image is printed on the printing object 10, droplets of ink (ink droplets) are discharged while the print head 32 moves along the rail 38. During the movement of the print head 32, the gripping device 20 moves the printing object 10 to thereby keep the distance between the print head 32 and the printing surface of the printing object 10 within a predetermined value. As a result, the relative position and the relative attitude of the print head 32 relative to the printing object 10 change. The relative position and the relative attitude of the print head 32 relative to the printing object 10 will hereinafter also be referred to simply as the relative position and the relative attitude of the print head 32, respectively.

Figure 2:
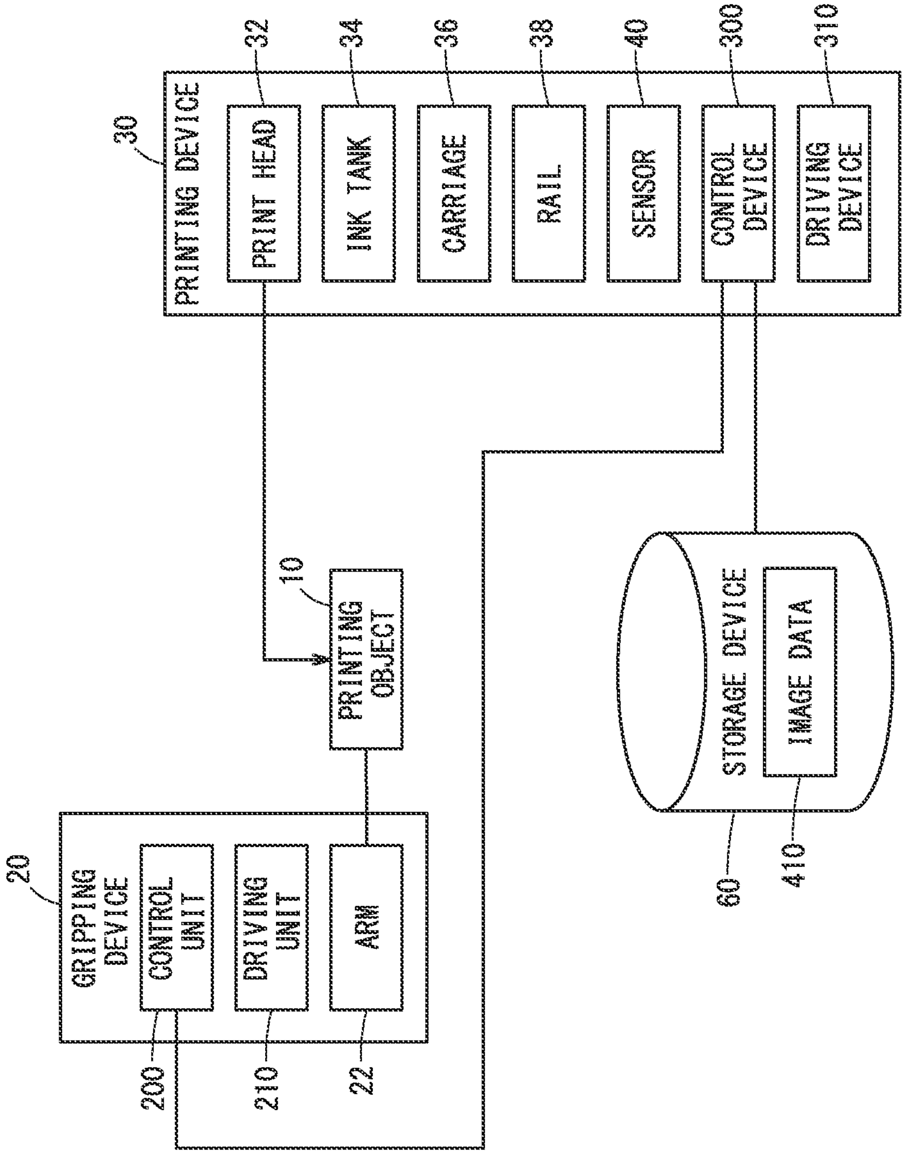
FIG. 2 is a diagram schematically illustrating a configuration of a gripping device, a printing device, and a storage device.

FIG. 2 is a diagram schematically illustrating a configuration of the gripping device 20, the printing device 30, and a storage device 60. The gripping device 20 is mounted on a movable base (not shown). The gripping device 20 further includes a control unit 200 and a driving unit 210 in addition to the arm 22 described above. The driving unit 210 is, for example, a motor.

The control unit 200 controls the driving unit 210 so that the driving unit 210 can move the arm 22. By moving the arm 22 in this way, the printing object 10 can be moved in various directions. The control unit 200 controls the driving unit 210 so that the driving unit 210 can move the gripping device 20. By moving the gripping device 20 in this way, the printing object 10 can be moved in the X-axis direction and the Y-axis direction. Instead of the driving unit 210, an external device of the gripping device 20 may move the gripping device 20.

The control unit 200 includes a processing circuit and a storage unit. The processing circuit includes a processor such as a CPU (Central Processing Unit). The storage unit includes a volatile memory such as a RAM (random access memory) and a non-volatile memory such as a ROM (read-only memory) and a flash memory. The storage unit stores programs and the like. When the processing circuit executes the program, the control unit 200 controls the arm 22 and the driving unit 210.

The printing device 30 further includes a control device 300 and a driving device 310. The driving device 310 is, for example, a motor. When an image is printed, the control device 300 controls the driving device 310 to move the carriage 36 in the X-axis direction along the rail 38. Accordingly, the print head 32 moves in the X-axis direction along the rail 38. At the time of printing an image, the control device 300 further controls the print head 32 to discharge ink droplets from the ink tank 34 toward the printing surface of the printing object 10.

The control device 300 includes a processing circuit and a storage unit. The processing circuit includes a processor such as a CPU (Central Processing Unit). The storage unit includes a volatile memory such as a RAM (random access memory) and a non-volatile memory such as a ROM (read-only memory) and a flash memory. The storage unit stores programs and the like. When the processing circuit executes the program, the control device 300 controls the print head 32, the sensor 40, and the driving device 310 and communicates with the control unit 200 of the gripping device 20.

The storage device 60 stores image data 410. The image data 410 is data of an image to be printed on the printing object 10. The control device 300 of the printing device 30 prints a print image on the printing object 10, based on the image data 410.

The control device 300 controls the print head 32 and the driving device 310 to print the print image on the printing object 10. At this time, the driving device 310 moves the print head 32 in the X-axis direction. In addition, when the control device 300 communicates with the control unit 200 of the gripping device 20, the control unit 200 controls the driving unit 210 to move the printing object 10. In this way, the print images are successively printed on the printing object 10 while the relative position and the relative attitude of the print head 32 relative to the printing object 10 are changed, in accordance with the program.

Figure 3:
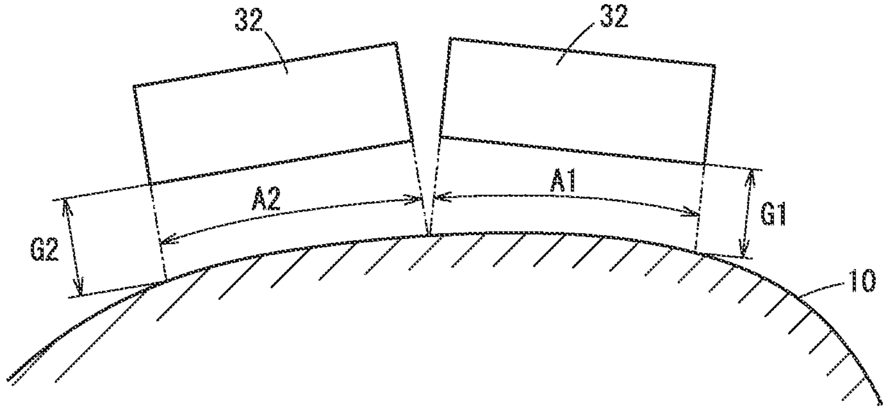
FIG. 3 is a diagram illustrating how a relative position and a relative attitude of a print head relative to the printing object change.

FIG. 3 is a diagram illustrating how the relative position and the relative attitude of the print head 32 relative to the printing object 10 change. In FIG. 3, the first image and the second image are printed respectively in a first region A1 and a second region A2 of the printing surface of the printing object 10, in a manner of adjoining each other. The printing surface of the printing object 10 has a non-flat three dimensional shape.

The relative position of the print head 32 when the first image is printed in the first region A1 is set to a position substantially directly above the first region A1. In this case, the relative attitude of the print head 32 is set such that the value of the distance G1 between the print head 32 and the first region A1 is within a predetermined value G0. After the first image has been printed in the first region A1, the relative position of the print head 32 is moved by the movement of the printing object 10, and the second image is then printed in the second region A2.

The relative position of the print head 32 when the second image is printed in the second region A2 is set to a position substantially directly above the second region A2. In this case, the relative attitude of the print head 32 is set such that the value of the distance G2 between the print head 32 and the second region A2 is within the above predetermined value G0. In the example shown in FIG. 3, the relative position and the relative attitude of the print head 32 when the first image is printed are different from the relative position and the relative attitude of the print head 32 when the second image is printed.

Figure 4A:
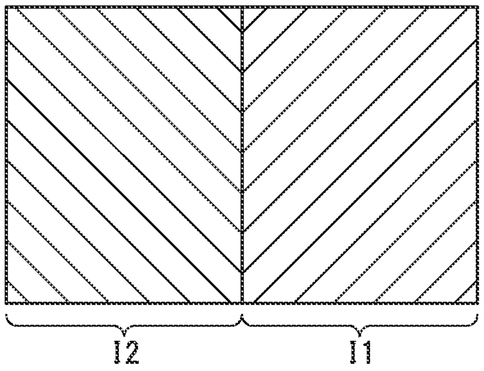
FIG. 4A is a diagram schematically illustrating a first image and a second image that adjoin each other.

FIG. 4A is a diagram schematically showing a first image I1 and a second image I2 that adjoin to each other. The first image I1 and the second image I2 are printed on a printing surface having a non-flat three dimensional shape. As described above, the relative position and the relative attitude of the print head 32 may be different between when the first image I1 is printed and when the second image I2 is printed. In this case, despite the printing according to the program, there is a possibility that the second image I2 may be printed without precisely adjoining the first image I1. More specifically, there is a possibility that the second image I2 may be printed away from the first image I1 or partially superimposed on the first image I1.

If the first image I1 and the second image I2 do not precisely adjoin each other, a white streak or a black streak may occur in the printed image. In the present embodiment, the relative position and the relative attitude of the print head 32 are adjusted as follows so that the first image I1 and the second image I2 precisely adjoin each other.

Figure 4B:
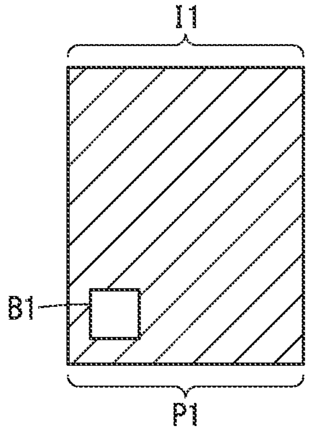
FIG. 4B is a diagram schematically showing a first print image.

FIG. 4B is a diagram schematically showing a first print image P1. The first print image (an image with a hole) P1 is obtained by forming an unprinted region (a blank region or a hole region) B1 in the first image I1. The unprinted region B1 is a partial region of the first print image P1 and is a region in which an image is partially lost. The first print image P1, instead of the first image I1, is printed on the printing surface of the printing object 10, at the relative position and the relative attitude of the print head 32 when the first image I1 is printed.

As a specific operation, the control device 300 of the printing device 30 acquires first image data in which the unprinted region B1 is formed in the first image I1, from the image data 410. The control device 300 controls the print head 32 and the driving device 310 while communicating with the control unit 200 of the gripping device 20 to print the first print image P1 on the printing object 10, based on the first image data. The printing object 10 is set so as to be in an attitude used when the first image I1 is printed, by the gripping device 20.

When the first print image P1 is printed, the relative position and the relative attitude of the print head 32 change. At the relative position and relative attitude of the print head 32 when the second image I2 is printed, the unprinted region (the blank region) B1 is detected by means of the sensor 40 provided on the print head 32. Based on the detected unprinted region B1, the relative position and the relative attitude of the print head 32 are adjusted by the gripping device 20 such that the second image I2 adjoins the first image I1.

Figure 4C:
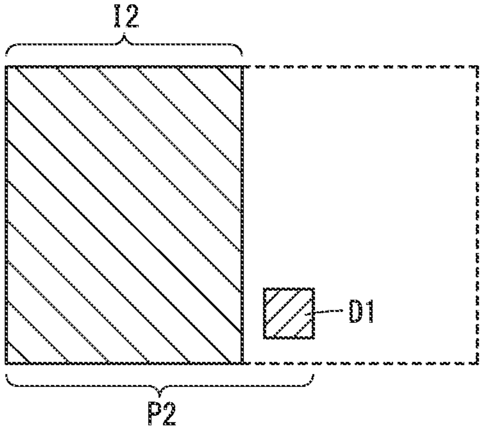
FIG. 4C is a diagram schematically showing a second print image.

FIG. 4C is a diagram schematically showing the second print image P2. The second print image P2 includes the second image I2 and a partial image D1 of the first image I1. The partial image D1 is an image in the first image I1 that corresponds to the unprinted region (the blank region) B1 of the first print image P1. When the partial image D1 is printed in the unprinted region B1 without misalignment, the first image I1 is completely printed.

As described above, the relative position and the relative attitude of the print head 32 are adjusted based on the unprinted region B1. Therefore, when the partial image D1 of the second print image P2 is printed in the unprinted region B1 without misalignment with respect thereto, a white streak or a black streak does not occur at the boundary between the first image I1 and the second image I2. Thus, the second image I2 can be printed so as to adjoin the first image I1.

As a specific operation, the control device 300 of the printing device 30 acquires second image data including the second image I2 and the partial image D1, from the image data 410. The control device 300 controls the print head 32 and the driving device 310 while communicating with the control unit 200 of the gripping device 20 to print the second print image P2 on the printing object 10, based on the second image data. The printing object 10 is set so as to be in an attitude used when the second image I2 is printed, by the gripping device 20.

The smaller the unprinted region B1 and the partial image D1 are, the higher the accuracy with which the partial image D1 is printed in the unprinted region B1 without misalignment is. Therefore, it is preferable that the unprinted region B1 and the partial image D1 be smaller. However, the unprinted region B1 and the partial image D1 need to be large enough to be detected by the sensor 40. In addition, it is preferable that the unprinted region B1 be formed at an end portion rather than a central portion of the first print image P1.

Figure 5:
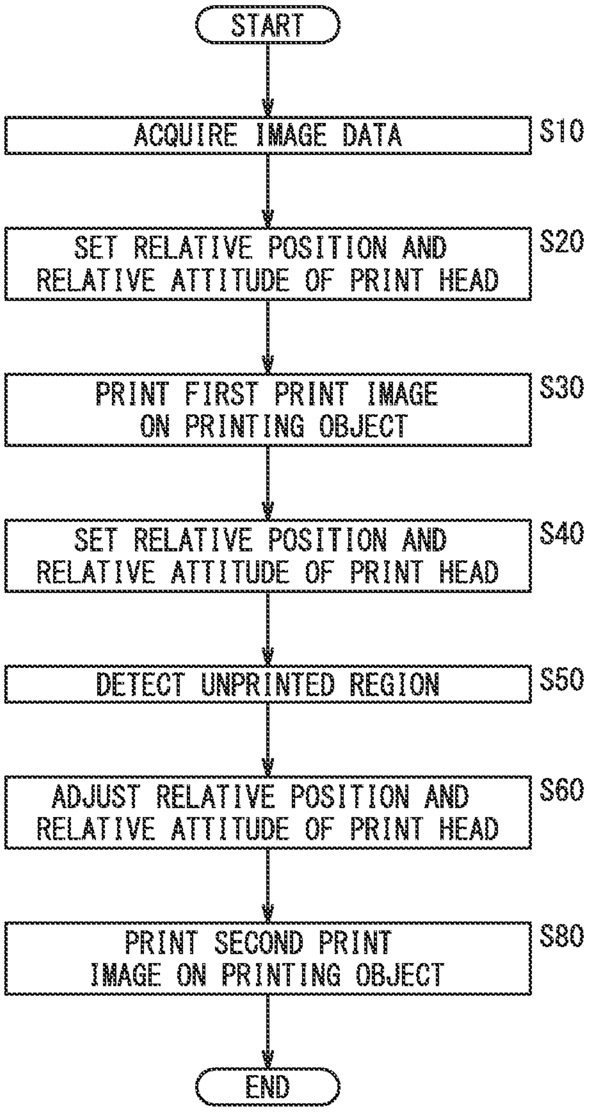
FIG. 5 is a flowchart illustrating a processing procedure for printing the first print image and the second print image on the printing object.

FIG. 5 is a flowchart illustrating a processing procedure for printing the first print image P1 and the second print image P2 on the printing object 10. This processing procedure is performed by, for example, a processing circuit included in the control device 300 of the printing device 30 executing a program. When this processing procedure is started, in step S10, the control device 300 acquires the image data 410 from the storage device 60. That is, the control device 300 acquires the first image data and the second image data described above.

In step S20, the control device 300 controls the print head 32 to set the relative position and the relative attitude of the print head 32 relative to the printing object 10. The relative position and the relative attitude of the print head 32 are set to the relative position and the relative attitude of the print head 32 used when the first image I1 is printed. In step S30, the control device 300 controls the print head 32 to print the first print image P1 on the printing surface of the printing object 10, based on the first image data.

In step S40, the control device 300 controls the print head 32 to set the relative position and the relative attitude of the print head 32 relative to the printing object 10. The relative position and the relative attitude of the print head 32 are set to the relative position and the relative attitude of the print head 32 used when the second image I2 is printed. In step S50, the control device 300 controls the sensor 40 to thereby cause the sensor 40 to detect the unprinted region B1.

In step S60, the control device 300 controls the print head 32 such that the partial image D1 is printed in the unprinted region B1 without misalignment. That is, the control device 300 adjusts the relative position and the relative attitude of the print head 32 based on the detected unprinted region B1.

In step S80, the control device 300 controls the print head 32 to print the second print image P2 on the printing surface of the printing object 10, based on the second image data. Thus, the second image I2 is printed so as to adjoin the first image I1. When step S80 is completed, this processing procedure is ended.

Modifications

The above-described embodiment may be modified as follows.

(Modification 1)

In the above-described embodiment, the first print image P1 is obtained by forming the unprinted region (the blank region) B1 in the first image I1. The first print image P1 may be obtained by forming a plurality of unprinted regions that are spaced from each other in the first image I1.

Figure 6A:
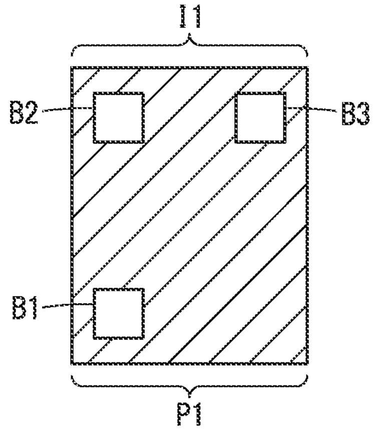
FIG. 6A is a diagram schematically illustrating a first print image to be printed on a printing object by a printing method according to a first modification.

FIG. 6A is a diagram schematically showing a first print image P1 to be printed on the printing object 10 by a printing method according to the first modification. In the present modification, the first print image P1 is obtained by forming three unprinted regions B1, B2, and B3 in the first image I1 so as to be spaced from each other.

Figure 6B:
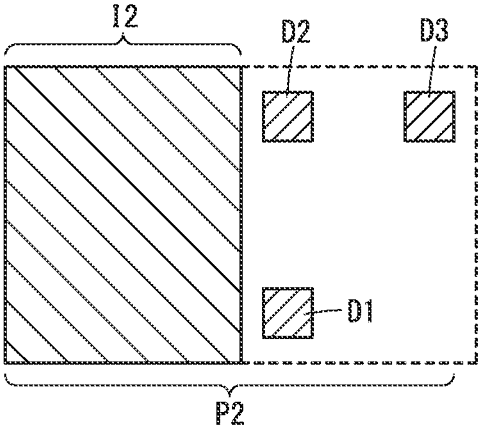
FIG. 6B is a diagram schematically showing a second print image.

FIG. 6B is a diagram schematically showing a second print image P2. The second print image P2 includes the second image I2 and partial images D1, D2, and D3 of the first image I1. The partial images D1, D2, and D3 are images in the first image I1 that correspond respectively to the unprinted regions B1, B2, and B3 of the first print image P1. The partial images D1, D2, and D3 are printed in the unprinted regions B1, B2, and B3, respectively, without misalignment. As a result, the first image I1 is completely printed.

Since the first print image P1 has the two unprinted regions B1 and B2 spaced from each other, it is possible to prevent the second image I1 from being misaligned relative to the first image I2 in the rotation direction.

In the example shown in FIG. 6A, the contours of the first image I1 and the first print image P1 are rectangular. The two unprinted regions B1 and B3 are spaced apart from each other on a diagonal line of the first image I1. That is, the first print image P1 has two unprinted regions B1 and B3 on a diagonal line. Accordingly, it is possible to precisely adjust the relative position and the relative attitude of the print head 32 when the second print image P2 is printed.

(Modification 2)

In the above-described embodiment, the first print image P1 is obtained by forming the unprinted region B1 in the first image I1. In the example of the first print image P1 shown in FIG. 4B, the shape of the unprinted region B1 is rectangular. In a case where an image of the printed first print image P1 is captured at the relative position and the relative attitude of the print head 32 used when the second image I2 is printed, the shape of the unprinted region B1 in the captured image may not be rectangular.

Alternatively, when printing is performed on a printing surface having a non-flat three dimensional shape, deformation of the unprinted region B1 may occur. Also in this case, the shape of the unprinted region B1 in a similarly captured image is deformed into a non-rectangular shape.

Figure 7A:
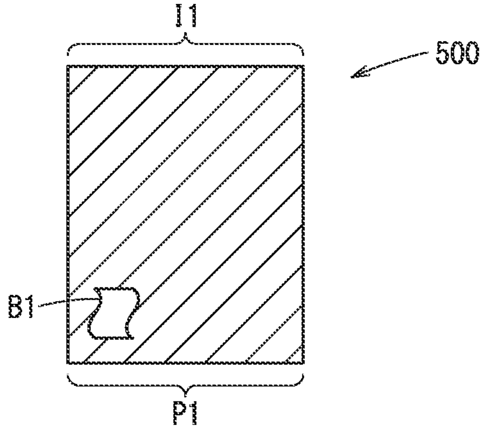
FIG. 7A is a diagram schematically illustrating a captured image of a first print image printed by a printing method according to a second modification.

FIG. 7A is a diagram schematically showing a captured image 500 of the first print image P1 printed by the printing method according to the second modification. The shape of the unprinted region B1 detected based on the captured image 500 is deformed into a shape that is not rectangular.

Figure 7B:
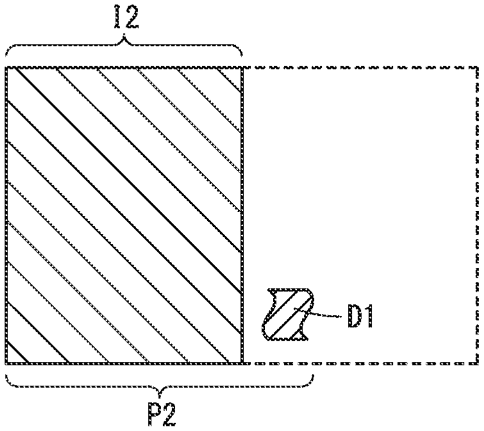
FIG. 7B is a diagram schematically showing a second print image.

FIG. 7B is a diagram schematically showing the second print image P2. A second print image P2 including the second image I2 and the partial image D1 that has been modified according to the shape of the detected unprinted region B1 is printed on the printing surface of the printing object 10. The partial image D1 is printed in the unprinted region B1 without misalignment. At the same time, the second image I2 is printed so as to adjoin the first image I1.

As a specific operation, the control device 300 of the printing device 30 acquires second image data including the second image I2 and the partial image D1, from the image data 410. The control device 300 modifies the second image data such that the partial image D1 has the shape of the detected unprinted region B1. The control device 300 controls the print head 32 and the driving device 310 while communicating with the control unit 200 of the gripping device 20 to print the second print image P2 on the printing object 10 based on the modified second image data. The printing object 10 is set so as to be in an attitude used when the second image I2 is printed, by the gripping device 20.

Figure 8:
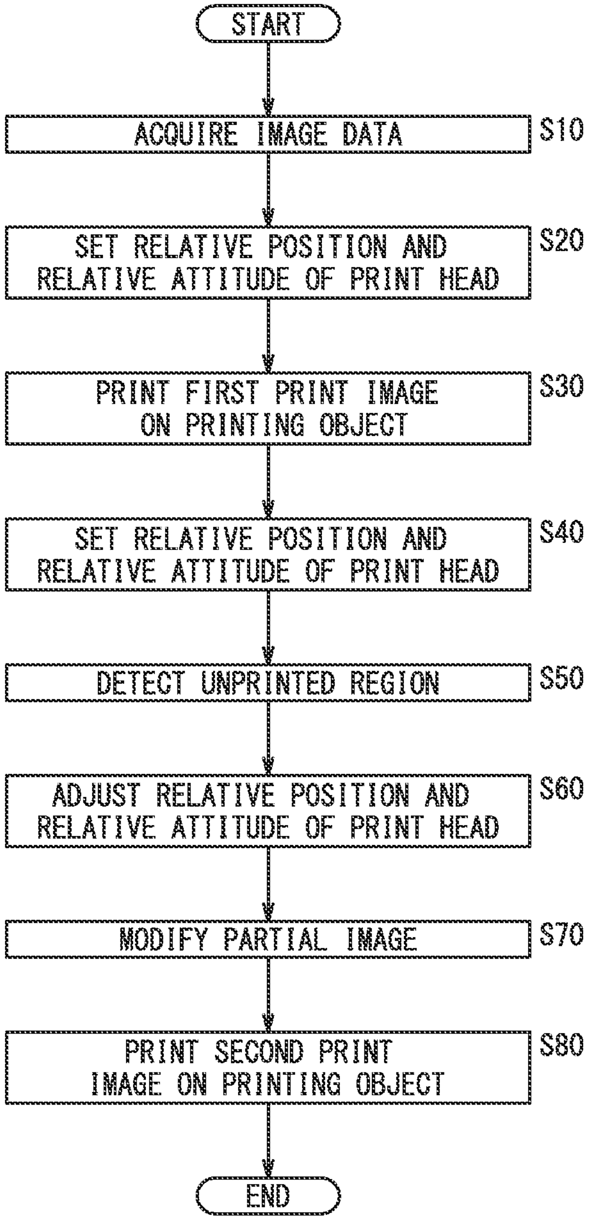
FIG. 8 is a flowchart illustrating a processing procedure for printing the first print image and the second print image on a printing object in the second modification.

FIG. 8 is a flowchart illustrating a processing procedure for printing the first print image P1 and the second print image P2 on the printing object 10 in the second modification. This processing procedure is performed by, for example, the processing circuit included in the control device 300 of the printing device 30 executing a program. This processing procedure includes steps S10 to S80. Since steps S10 to S60 and step S80 have already been described with reference to the flowchart shown in FIG. 5, the description of these steps is omitted in the following description.

When the processing of step S60 is completed, the processing procedure proceeds to step S70. In step S70, the control device 300 modifies the partial image D1 in accordance with the shape of the unprinted region B1 detected in step S60. The second print image P2 includes the second image I2 and the modified partial image D1. When the processing of step S70 is completed, the processing procedure proceeds to step S80. When the processing of step S80 is completed, this processing procedure is ended.

(Modification 3)

In the embodiment described above, the second image data includes the second image I2 and the partial image D1. However, the second image data may correspond to only the second image I2. In this case, the image data 410 further includes partial image data corresponding to the partial image D1. The control device 300 adjusts the relative position and the relative attitude of the print head 32 based on the detected unprinted region B1, and thereafter prints the second print image P2 on the printing surface of the printing object 10. At this time, the control device 300 prints the second print image P2 on the printing surface of the printing object 10 based on the second image data and the partial image data.

Note that the present invention is not limited to the above-described embodiment and modifications, and various configurations can be adopted without departing from the gist of the present invention.

INVENTION OBTAINED FROM EMBODIMENT

The invention that can be grasped from the above-described embodiment and modifications will be described below.

(1) The printing method of printing the first image (I1) and the second image (I2) on the printing object (10), by using the print head (32), while changing the relative position and the relative attitude of the print head relative to the printing object, includes: a first printing step of printing the first print image (P1) on the printing object by using the print head, the first print image being obtained by forming the unprinted region (B1, B2, B3) in the first image; a detecting step of detecting the unprinted region, by using the sensor (40) provided on the print head, at the relative position and the relative attitude of the print head used when the second image is printed; an adjusting step of adjusting the relative position and the relative attitude of the print head such that the second image adjoins the first image, based on the unprinted region that has been detected; and a second printing step of printing the second print image (P2) on the printing object by using the print head, the second print image including the second image and a partial image (D1, D2, D3) to be printed in the unprinted region. With this configuration, it is possible to prevent white streaks or black streaks from occurring in a printed image without impairing image quality.

(2) In the second printing step, the second print image including the second image and the partial image that has been modified in accordance with the shape of the unprinted region that has been detected may be printed. With this configuration, even in a case where the printing object has a printing surface having a non-flat three dimensional shape, it is possible to prevent white streaks or black streaks from occurring in the printed image.

(3) The first print image may include the plurality of unprinted regions that are spaced from each other, and in the second printing step, the plurality of partial images may be printed in the plurality of unprinted regions, respectively. With this configuration, it is possible to accurately prevent white streaks or black streaks from occurring in the printed image.

(4) The contour of the first image may have a rectangular shape, and at least two of the plurality of unprinted regions may be located on a diagonal line of the first image. With this configuration, it is possible to accurately prevent white streaks or black streaks from occurring in the printed image.

(5) In the first printing step, the first print image may be printed on the printing object based on first image data in which the unprinted region is formed in the first image, and in the second printing step, the second print image may be printed on the printing object based on second image data including the second image and the partial image. With this configuration, it is possible to easily prevent white streaks or black streaks from occurring in the printed image.

(6) The printing method may further include a modifying step of modifying the second image data such that the partial image has a shape of the unprinted region that has been detected, and in the second printing step, the second print image may be printed on the printing object, based on the second image data that has been modified. With this configuration, even when the printing surface has an uneven shape, it is possible to prevent white streaks or black streaks from occurring in the printed image.

(7) The printing object may have a printing surface having a non-flat three dimensional shape, and in the modifying step, the second image data may be modified in accordance with deformation of the unprinted region, the deformation being caused as a result of printing on the printing surface having the non-flat three dimensional shape. With this configuration, even in a case where the printing object has a printing surface having a non-flat three dimensional shape, it is possible to prevent white streaks or black streaks from occurring in the printed image.

(8) The printing object may have a printing surface having a non-flat three dimensional shape, and in the adjusting step, the relative position and the relative attitude of the print head may be adjusted in a state in which a distance (G1, G2) between the print head and the printing surface is kept within a predetermined value (G0). With this configuration, even in a case where the printing object has a printing surface having a non-flat three dimensional shape, it is possible to perform printing with high accuracy, since it is possible to prevent discharge of ink from being disturbed.

(9) The gripping device (20) gripping the printing object may move the printing object, to thereby change the relative position and the relative attitude of the print head, and after the first printing step in which the first print image has been printed on the printing object, in the second printing step, the print head may be moved in a predetermined direction by the driving device (310) and the second print image may be then printed on the printing object. With this configuration, it is possible to perform printing with high accuracy, since it is possible to prevent discharge of ink from being disturbed.

(10) The sensor may be a camera, and in the detecting step, the unprinted region may be detected based on an image (500) captured by the camera. With this configuration, the relative position and the relative attitude of the print head with respect to the printing object are precisely adjusted, and thus it is possible to accurately prevent white streaks or black streaks from occurring in the printed image.

What is claimed is:

1. A printing method of printing a first image and a second image on a printing object, by using a print head, while changing a relative position and a relative attitude of the print head relative to the printing object, the printing method comprising:

- a first printing step of printing a first print image on the printing object by using the print head, the first print image being obtained by forming an unprinted region in the first image;
- a detecting step of detecting the unprinted region by using a sensor provided on the print head, at the relative position and the relative attitude of the print head used when the second image is printed;
- an adjusting step of adjusting the relative position and the relative attitude of the print head in a manner so that the second image adjoins the first image, based on the unprinted region that has been detected; and
- a second printing step of printing a second print image on the printing object by using the print head, the second print image including the second image and a partial image to be printed in the unprinted region.

2. The printing method according to claim 1, wherein

- in the second printing step, the second print image including the second image and the partial image that has been modified in accordance with a shape of the unprinted region that has been detected is printed.

3. The printing method according to claim 2, wherein

- the unprinted region of the first print image comprises a plurality of unprinted regions that are spaced from each other,
- the partial image comprises a plurality of partial images, and
- in the second printing step, the plurality of partial images are printed in the plurality of unprinted regions, respectively.

4. The printing method according to claim 3, wherein

- a contour of the first image has a rectangular shape, and
- at least two of the plurality of unprinted regions are located on a diagonal line of the first image.

5. The printing method according to claim 1, wherein

- the unprinted region of the first print image comprises a plurality of unprinted regions that are spaced from each other,
- the partial image comprises a plurality of partial images, and
- in the second printing step, the plurality of partial images are printed in the plurality of unprinted regions, respectively.

6. The printing method according to claim 5, wherein

- a contour of the first image has a rectangular shape, and
- at least two of the plurality of unprinted regions are located on a diagonal line of the first image.

7. The printing method according to claim 1, wherein

- in the first printing step, the first print image is printed on the printing object based on first image data in which the unprinted region is formed in the first image, and
- in the second printing step, the second print image is printed on the printing object based on second image data including the second image and the partial image.

8. The printing method according to claim 7, further comprising:

- a modifying step of modifying the second image data in a manner so that the partial image has a shape of the unprinted region that has been detected,
- wherein
- in the second printing step, the second print image is printed on the printing object, based on the second image data that has been modified.

9. The printing method according to claim 8, wherein

- the printing object has a printing surface having a non-flat three dimensional shape, and
- in the modifying step, the second image data is modified in accordance with deformation of the unprinted region, the deformation being caused as a result of printing on the printing surface having the non-flat three dimensional shape.

10. The printing method according to claim 1, wherein

- the printing object has a printing surface having a non-flat three dimensional shape, and
- in the adjusting step, the relative position and the relative attitude of the print head are adjusted in a state in which a distance between the print head and the printing surface is kept within a predetermined value.

11. The printing method according to claim 10, wherein

- a gripping device gripping the printing object moves the printing object to thereby change the relative position and the relative attitude of the print head, and
- after the first printing step in which the first print image has been printed on the printing object, in the second printing step, the print head is moved in a predetermined direction by a driving device and the second print image is then printed on the printing object.

12. The printing method according to claim 1, wherein the sensor is a camera, and in the detecting step, the unprinted region is detected based on an image captured by the camera.

* * * * *